Figure 1:
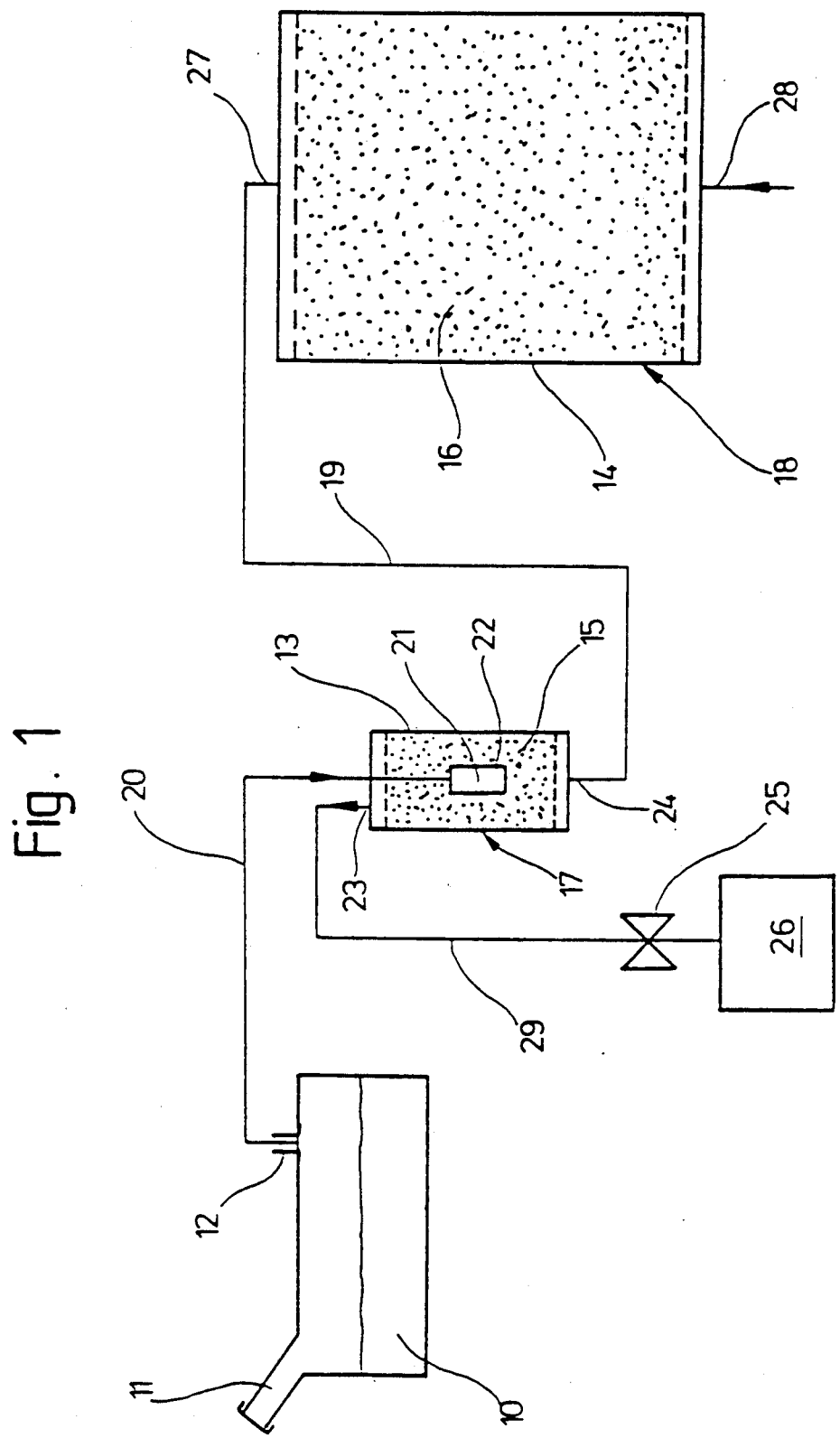

_United States Patent_ [19]

Franzke

[11] Patent Number: 5,143,041
[45] Date of Patent: Sep. 1, 1992

[54] VENTING DEVICE FOR A FUEL TANK OF AN INTERNAL COMBUSTION ENGINE

[75] Inventor: Klaus Franzke, Leonberg, Fed. Rep. of Germany

[73] Assignee: Robert Bosch GmbH, Stuttgart, Fed. Rep. of Germany

[21] Appl. No.: 656,092
[22] PCT Filed: May 30, 1990
[86] PCT No.: PCT/DE90/00404
§ 371 Date: Feb. 25, 1991
§ 102(e) Date: Feb. 25, 1991
[87] PCT Pub. No.: WO91/00192
PCT Pub. Date: Jan. 10, 1991

[30] Foreign Application Priority Data

Jun. 28, 1989 [DE] Fed. Rep. of Germany ....... 3921080

[51] Int. Cl.⁵ .................................................. F02M 33/02
[52] U.S. Cl. ..................................... 123/520; 123/516
[58] Field of Search ............... 123/516, 518, 519, 520, 123/521

[56] References Cited

U.S. PATENT DOCUMENTS

| | | | |
|---|---|---|---|
| 3,352,294 | 11/1967 | Biller | 123/521 |
| 3,515,107 | 6/1970 | Joyce | 123/520 |
| 3,575,152 | 4/1971 | Wentworth | 123/520 |
| 3,884,204 | 5/1975 | Krautwurst | 123/519 |
| 4,070,828 | 1/1978 | Barres | 123/521 |
| 4,279,233 | 7/1981 | Tobita | 123/519 |
| 4,872,439 | 10/1989 | Sonoda | 123/519 |
| 4,887,578 | 12/1989 | Woodcock | 123/519 |
| 4,951,643 | 8/1990 | Sato | 123/520 |

FOREIGN PATENT DOCUMENTS 0091357 5/1983 Japan ......................... 123/520

_Primary Examiner_—Carl S. Miller
_Attorney, Agent, or Firm_—Edwin E. Greigg; Ronald E. Greigg

[57] ABSTRACT

A venting device for a fuel tank of an internal combustion engine having activated carbon filters via which the fuel tank is vented. During the shut-off phase of the internal combustion engine, the activated carbon filters absorbs the fuel which evaporates in the tank. In the operating phase of the internal combustion engine, the activated carbon filters are regenerated by flushing air. To keep down the flushing air required for regeneration, the activated carbon filter is subdivided into two filter parts, the volume of the first filter part being dimensioned so that, in the shut-off phases of the internal combustion engine, the first filter part reaches a high level of loading. Due to a diffusion-hindering connection between the two filter parts, the second filter part only likewise absorbs fuel vapor after the degree of saturation of the first filter part has been reached.

13 Claims, 2 Drawing Sheets

VENTING DEVICE FOR A FUEL TANK OF AN INTERNAL COMBUSTION ENGINE

PRIOR ART

The invention starts from a venting device for a fuel tank of an internal combustion engine as set forth hereinafter.

Such a venting devices (sic) serves to prevent fuel which evaporates in the fuel tank, so-called fuel vapour, which arises, in particular, during the filling of the fuel tank or in the hot shut-off phase of the internal combustion engine, from escaping into the atmosphere, instead being stored in a fuel vapour filter. During the operation of the internal combustion engine, the filter is then regenerated by flushing with fresh air which is sucked in by the intake system of the internal combustion engine via the fuel filter. The fuel-laden flushing air is then fed to the internal combustion engine in metered fashion for combustion (DE 33 46 103 C2, DE 38 02 664 C1).

In the U.S.A., such venting devices must be subjected to a so-called "on-board-refuelling test" to prove their efficiency, in which test a fixed limiting value for the hydrocarbons set free with the evaporation of fuel must be complied with. In such a test, a number of operating cycles of the internal combustion engine with intermediate shut-off phases are performed, starting from a fully laden fuel vapour filter. After the last shut-off phase, the fuel tank is filled. The hydrocarbon values measured at the filter outlet during this procedure must be below the limiting value.

In order to be able to comply with this limiting value at a volume of the fuel vapour filter which is still acceptable, it is necessary to remove the fuel vapour arising in shut-off phases of the internal combustion engine again during the operating phases of the internal combustion engine in order in this way, at the end of the test cycles, to achieve a loading condition of the fuel vapour filter in which the latter is still capable of reliably absorbing the quantity of fuel vapour arising during refuelling. The quantity of flushing air required to remove a certain mass of fuel vapour in the regeneration of the fuel filter increases exponentially with increasing unloading of the fuel vapour filter, i.e. as the degree of loading of the fuel vapour filter decreases. This means that, given the relatively low loading condition which the fuel vapour filter reaches during one shut-off phase of the internal combustion engine within the test cycles, a very large quantity of flushing air is required in the subsequent operating phase of the internal combustion engine in order to remove the fuel vapour from the filter again.

Advantages of the invention

In contrast, the venting device according to the invention has an advantage that, while a relatively small total filter volume is retained, the quantity of flushing air required for the regeneration of the fuel vapour filter in the operating phases of the internal combustion engine is small. The subdivision of the filter into two filter parts opens up the possibility of making the first filter part very small, with the result that it achieves a very high degree of loading in each shut-off phase of the internal combustion engine and can thus be unloaded again reliably and with certainty during the subsequent operating phase of the internal combustion engine using only a small quantity of flushing air. The dimensions of the second filter part are then to be made sufficiently large to enable it, at the end of the test cycles concluding with a shut-off phase of the internal combustion engine—and hence with the first filter part fully laden—to absorb the volume of fuel vapour arising during refuelling. The diffusion-hindering connection between the two filter parts ensures that fuel vapour does not already pass into the second filter part when the first filter part is not yet laden to the maximum extent, thus resulting in a premature, slight loading, of the second filter part, which cannot be removed because of the small quantity of flushing air during the individual test cycles. The flushing air is always sucked in via the outlet of the second filter part and flows through the two filter parts in the reverse direction to the fuel vapour and, laden with fuel, then passes via the intake system of the internal combustion engine into the combustion chamber of the latter.

Advantageous further developments and improvements of the venting device are possible by virtue of the measures presented hereinafter.

The volume of the first filter part is expediently to be adapted to the conditions of the stipulated test for testing the efficiency of the venting device, so that, in each test cycle, the first filter part achieves a very high, virtually maximum loading condition due to the quantity of fuel arising, which loading condition is reduced again completely with little flushing air in the subsequent test cycle before this loading condition is reached again, at the end of this subsequent test cycle, in the shut-off phase of the internal combustion engine. At the end of the last test cycle, the first filter part is laden to saturation. The volume of the second filter part is to be dimensioned such that—when the first filter part is completely saturated and hence no longer capable of absorption—it can bind the quantities of evaporated fuel arising during the filling of the fuel tank under test conditions and achieves a large degree of saturation.

According to a preferred embodiment of the invention, the two filter parts are accommodated in separate containers, which are connected to one another in a manner which hinders diffusion. This has the advantage that the very small first filter part can be arranged in the engine compartment in order thus to be able easily to implement auxiliary measures for the regeneration or desorption of the fuel vapour filter, e.g. heating. However, the two filter parts can also be accommodated in a single container together with the diffusion-hindering connection.

The diffusion-hindering connection between the two filter parts can be constructed in various ways. According to a preferred embodiment of the invention, it is formed by a relatively long tube. However, it is also possible to produce this connection by means of a solenoid valve or vacuum-controlled valve which is opened during the operation of the internal combustion engine and thus connects the two filter parts to one another. In the blocking condition of the solenoid valve during the shut-off phases of the internal combustion engine, the solenoid valve opens in the direction from the first to the second filter part above a pressure which is below the filling pressure during refuelling of the fuel tank.

DRAWING

Figure 2:
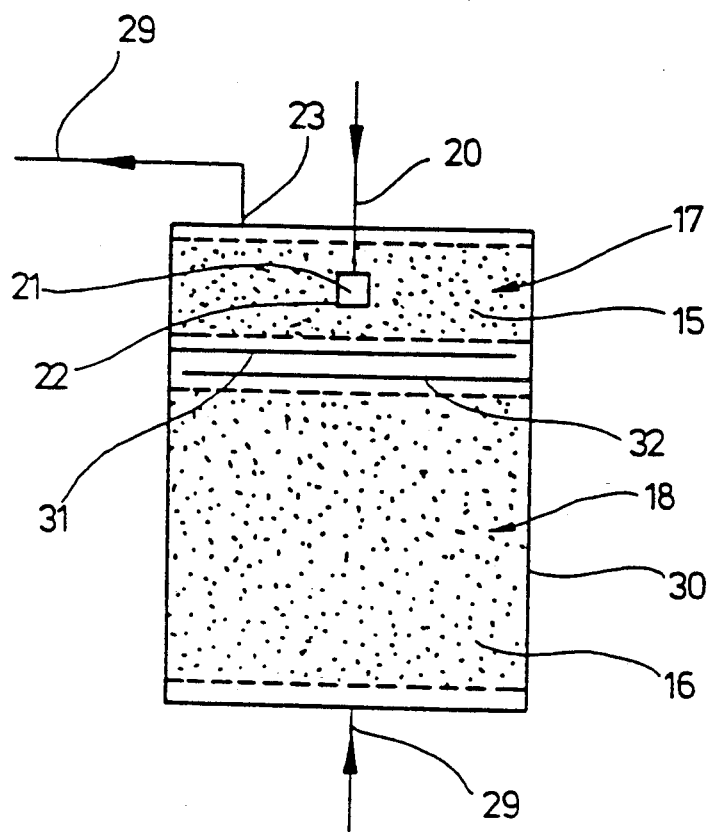

The invention is explained in greater detail in the description which follows, with reference to illustrative embodiments depicted in the drawing, in which, the drawing is a each case in schematic representation:

FIG. 1 shows a venting device connected to a fuel tank of an internal combustion engine, FIG. 2 shows a venting device according to a second illustrative embodiment.

DESCRIPTION OF THE ILLUSTRATIVE EMBODIMENTS

In FIG. 1, 10 denotes a fuel tank which bears a fuel filler pipe 11 and a vent branch 12, which are arranged on its upper side. The venting device for the fuel tank 10, said device being only schematically sketched, has two containers 13, 14, each of which is filled with activated carbon 15, 16. The containers 13, 14 filled with activated carbon 15, 16 form two filter parts 17, 18 of an activated carbon filter in which fuel evaporating in the fuel tank 10 can be bound. The two containers 13, 14 are connected to one another in series by a relatively long tube 19 which prevents diffusion of fuel from the first filter part 17 to the second filter part 18. The first container 13 is connected to the vent branch 12 of the fuel tank 10 via a vent line 20. The vent line 20 opens inside a hollow space 21 which is arranged centrally in the container 13 and is formed within the activated carbon 15 by means of a cylindrical screen 22. An inlet, end 23 and an outlet 24 are provided at opposite end faces of the container 13. While the tube 19 is connected to the outlet 24 the inlet 23 is connected by means of an extraction line 29, via a flushing-air control 25, to the intake system 26 of the internal combustion engine. The flushing-air control 25 serves for the metered admixture of fuel-laden flushing air to the fuel/air mixture of the internal combustion engine. An example of a flushing-air control is described in DE 38 02 664 C1. Container 14, which is completely filled with activated carbon 15, likewise has an inlet 27 and an outlet 28 at opposite end faces. The inlet 27 is connected to the tube 19 and the outlet 28 is open to the atmosphere and serves for the entry of flushing air.

A so-called "on-board refuelling test" comprises three test cycles and a subsequent heating up of the tank by a defined amount. This procedure is carried out three times in succession. At the end of the test, the tank is filled with a certain quantity of fuel. Each test cycle comprises an operating phase of the internal combustion engine under predetermined conditions and, following this, a one-hour shut-off phase of the internal combustion engine. The volume of the activated carbon 15 in the container 13 is dimensioned such that, at the end of each test cycle, the filter part 17 reaches a very high loading condition. In the operating phase of the following operating cycle, the container 13 is first of all flushed with fresh air and the activated carbon 15 thus regenerated and is then loaded with fuel vapour again in the shut-off phase of the internal combustion engine. At the end of the third test cycle, i.e. after the heating up, the filter part 17 is laden with fuel vapour to just up to the degree of saturation. The tube 19 prevents fuel vapour from passing from container 13 to container 14 by diffusion during these three test cycles. The volume of the activated carbon 16 in container 14 is dimensioned so that the fuel vapour arising during the filling of the tank after the 3×3 test cycles, loads filter part 18 to just up to the degree of saturation.

In each operating phase of the internal combustion engine, a suction pressure is generated by the intake system 26, as a result of which flushing air enters container 14 via the outlet 28, flows through the activated carbon 16, the tube 19 and the activated carbon 15 in container 13 and finally, laden with fuel, passes in metered fashion, via the flushing-air control 25, into the intake system 26 of the internal combustion engine. During this process, the activated carbon 15 and 16 in the two containers 13, 14 is regenerated, with the result that in subsequent shut-off phases of the internal combustion engine the fuel vapour filter comprising the filter part 17, 18 is capable of absorbing the evaporating fuel, including the quantity of fuel vapour arising during refuelling, and thus of preventing escape into the atmosphere.

In the venting device represented schematically in FIG. 2, the two filter parts 17, 18 are united in a single container 30. The smaller-volume first filter part 17 is spatially separated from the larger-volume second filter part 18, the partition walls 31, 32 being built into the container 30 in such a way that a meander-shaped connection is formed between the two filter parts 17, 18. In other respects, the construction and mode of operation of this venting device is identical to that described in FIG. 1.

The invention is not restricted to the illustrative embodiments described above. Thus, a large number of designs are possible for the connection preventing fuel crossing over by diffusion from filter part 17 to filter part 18. In FIG. 1, it is formed by a relatively long tube 19 and, in FIG. 2, by a meander-shaped connection produced by means of partition walls 31, 32. However, it can also be effected by a solenoid valve or vacuum-controlled valve which is always open whenever the internal combustion engine is in its operating phase. In the shut-off phase of the internal combustion engine, the solenoid valve is closed but is designed in such a way that, above a pressure slightly below the filling pressure during the refueling of the fuel tank, it opens in the direction from the first filter part 17 towards the second filter part 18.

It is obvious that rising vapor goes from the fuel tank 10 to the activated carbon filled tank 13 and after saturation the vapor goes via line 19 to the activated carbon filled tank 14. During flushing, air is drawn in via the outlet 28 of tank 14, passes through the activated carbon 16 in tank 14 and passes through line 19 to the tank 13. The flushing air then passes through the activated carbon 15 and out via the end 23 to the flushing air control 25 and into the intake of the engine.

I claim:

1. A venting device for a fuel tank of an internal combustion engine having a vent line which connects a vent branch of the fuel tank, via a fuel vapor filter having a storage effect for hydrocarbons, in particular an activated carbon filter, to atmosphere, and having an extraction line which leads to the intake system of the internal combustion engine and is connected to the fuel vapor filter, the fuel vapor filter is subdivided into a small-volume first filter part (17) and a large-volume second filter part (18) and the two filter parts (17, 18) are connected to one another by a relatively long tube (19) which prevents fuel crossing over as a result of diffusion and are arranged in series in the flow of fuel vapor in such a way that the vent and extraction line (20, 29) are connected to the first filter part (17) and the connection to the atmosphere is at the outlet (28) of the second filter part (18), and the volume of the first filter part (17) is dimensioned so that, after the completion of a test routine, comprising time phases of operation and of shut-off of the internal combustion engine, the first filter part (17) is laden to saturation with fuel vapor, and the volume of the second filter part (18) is dimensioned so that the quantity of fuel which evaporates during the filling of the fuel tank (10) can be absorbed by the said second filter part with the achievement of a high degree of loading.

2. A venting device for a fuel tank of an internal combustion engine having a vent line which connects a vent branch of the fuel tank, via a fuel vapor filter having a storage effect for hydrocarbons, in particular an activated carbon filter, to atmosphere, and having an extraction line which leads to the intake system of the internal combustion engine and is connected to the fuel vapor filter, in which the fuel vapor filter is subdivided into a small-volume first filter part (17) and a large-volume second filter part (18) and the two filter parts (17, 18) are connected to one another via a diffusion-hindering means which prevents fuel crossing over a result of diffusion and are arranged in series in the flow of fuel vapor in such a way that the vent and extraction line (20, 29) are connected to the first filter part (17) and the connection to the atmosphere is at the outlet (28) of the second filter part (18) and the connection between said filter parts (17 and 18) of the diffusion hindering means is effected by a solenoid valve which is open during the operation of the internal combustion engine and, in the blocking condition, opens at least in the direction from the first filter part (17) to the second filter part (18) above a pressure below the filling pressure during refueling of the fuel tank (10), and the volume of the first filter part (17) is dimensioned so that, after the completion of a test routine, comprising time phases of operation and of shut-off of the internal combustion engine, the first filter part (17) is laden to saturation with fuel vapor, and the volume of the second filter part (18) is dimensioned so that the quantity of fuel which evaporates during the filling of the fuel tank (10) can be absorbed by the said second filter part with the achievement of a high degree of loading.

3. A venting device for a fuel tank of an internal combustion engine having a vent line which connects a vent branch of the fuel tank, via a fuel vapor filter having a storage effect for hydrocarbons, in particular an activated carbon filter, to atmosphere, and having an extraction line which leads to the intake system of the internal combustion engine and is connected to the fuel vapor filter, the fuel vapor filter is subdivided into a small-volume first filter part (17) and a large-volume second filter part (18) and the two filter parts (17, 18) are connected to one another via a diffusion-hindering means which prevents fuel crossing over as a result of diffusion and are arranged in series in the flow of fuel vapor in such a way that the vent and extraction line (20, 29) are connected to the first filter part (17) and the connection to the atmosphere is at the outlet (28) of the second filter part (18), and the volume of the first filter part (17) is dimensioned so that, after the completion of a test routine, comprising time phases of operation and of shut-off of the internal combustion engine, the first filter part (17) is laden to saturation with fuel vapor, and the volume of the second filter part (18) is dimensioned so that the quantity of fuel which evaporates during the filling of the fuel tank (10) is absorbed by the said second filter with the achievement of a high degree of loading.

4. A device according to claim 2, characterized in that the diffusion-hindering connection of the two filter parts (17, 18) is produced by a relatively long tube (19).

5. A device according to claim 2, characterized in that the diffusion-hindering connection is effected by a solenoid valve which is open during the operation of the internal combustion engine and, in the blocking condition, opens at least in the direction from the first to the second filter part (17, 18) above a pressure below the filling pressure during refuelling of the fuel tank (10).

6. A device according to claim 3 in which said first filter part (17) is accommodated in a first container (13) said second filter part is accommodated in a second container (14), and the diffusion-hindering means connection (19) is produced between said first and second containers (13, 14).

7. A device according to claim 4, in which said first filter part (17, 18) is accommodated in a first container (13) said second filter part is accommodated in a second container 14, and the diffusion-hindering means connection (19) is produced between said first and second containers (13, 14).

8. A device according to claim 5, in which said first filter part (17, 18) is accommodated in a first container (13) said second filter part is accommodated in a second container 14, and the diffusion-hindering means connection (19) is produced between said first and second containers (13, 14).

9. A device according to claim 1, in which said first filter part (17, 18) is accommodated in a first container (13) said second filter part is accommodated in a second container 14, and the diffusion-hindering means connection (19) is produced between said first and second containers (13, 14).

10. A device according to claim 2, in which said first filter part (17, 18) is accommodated in a first container (13) said second filter part is accommodated in a second container 14, and the diffusion-hindering means connection (19) is produced between said first and second containers (13, 14).

11. A device according to claim 3, in which the first and second filter parts (17, 18), and the diffusion-hindering means connection (31, 32) are accommodated in a single container (30).

12. A device according to claim 1, in which the first and second filter parts (17, 18), and the diffusion-hindering means connection (31, 32) are accommodated in a single container (30).

13. A device according to claim 2, in which the first and second filter parts (17, 18), and the diffusion-hindering means connection (31, 32) are accommodated in a single container (30).

* * * * *